Patented Mar. 24, 1942

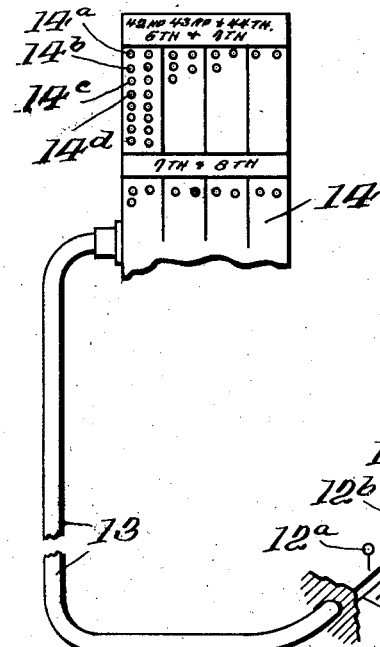
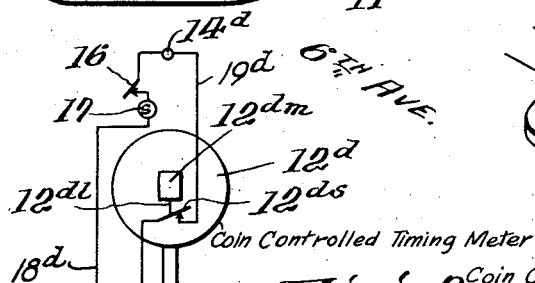
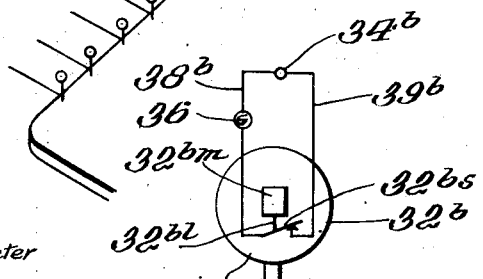
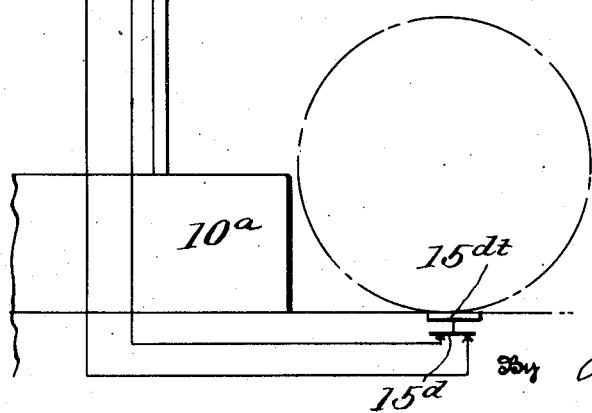

2,277,612

UNITED STATES PATENT OFFICE 2,277,612

PARKING METER SYSTEM

William Stuart Symington, New York, N. Y., assignor to Vehicular Parking, Ltd., Washington, D. C., a corporation of Delaware Application June 30, 1938, Serial No. 216,807

5 Claims. (Cl. 161—15)

My invention relates to a system for regulating the parking or standing of vehicles.

One of the objects of my invention is the regulation or control of vehicular parking in a simple, efficient and thoroughly practical manner requiring a minimum of police attention and supervision.

Another object is the provision of a system for regulating the parking or standing of vehicles which gives prompt and reliable indication at a central control station when a vehicle overstays its parking privilege.

A further object is the provision of a system for regulating vehicle parking which gives visual indication at a convenient central point when a vehicle is parked without payment of parking privilege, as well as when the vehicle is permitted to remain in parking position after the expiration of a predetermined parking period.

Other objects in part will be obvious and in part pointed out hereinafter.

The invention accordingly consists in the combination of elements, features of construction and arrangement of parts, as disclosed herein, the scope of the application of which is indicated in the following claims.

In the accompanying drawing, Figure 1 represents a city street with provisions for vehicle parking, and central parking register station in accordance with my invention, Figure 2 is a schematic representation of the electrical signal circuit employed in my system of Figure 1, and Figure 3 is a schematic diagram of a modified signal circuit.

Like reference characters denote like parts throughout the several views of the drawing.

As conducive to a clearer understanding of certain features of my invention it may be noted at this point that in the control or regulation of the parking of vehicles, the time of parking is conveniently measured by means of a parking meter. Such meters are commonly spaced along the street curb at such intervals as to provide adequate room for automobiles. The particular meter associated with a parking space is put into operation by the operator of the vehicle. Ordinarily the meter is of such character as to be put into operation by a coin or token deposited by the operator. Other meters are known, however, where initiation of operation is effected directly through the vehicle. The control relationship between vehicle and meter is either mechanical, electrical or magnetic.

In heretofore known meter systems for regulating the parking or standing of vehicles, the expiration of parking privilege is indicated by the parking meter. Some visual or aural indicator on the meter itself is ordinarily provided. In connection with the coin-actuated meters, a semaphore element is commonly employed. When the parking period has expired, as measured by the timing element of the meter, the signalling or indicating means are actuated to denote the expiration of parking privilege.

Where a vehicle is permitted to remain in a parking space after an overstay of parking privilege, this constitutes a traffic violation. It is the duty of a police officer to notify the operator of the vehicle of the violation and summon him to appear before a traffic court for a hearing in the matter. It is rather costly to adequately patrol a section of the city where parking is regulated. The services of a number of police officers are required to keep proper surveillance of the parking meters. This service is expensive and is not entirely satisfactory. Examination of the meters at frequent intervals throughout the day is essential.

One of the objects of my invention, therefore, is the provision of a system for the regulating of parked vehicles wherein there is immediately given indication at some central point of the expiration of parking privilege adjacent any one meter, assuring ready knowledge of improper parking and permitting direct savings in their surveillance of a group of meters.

Referring now more particularly to the practice of my invention, attention is directed to Figure 1 wherein there is generally indicated at 10 a portion of city street, illustratively 42nd Street with intersecting Sixth and Seventh Avenues. The street is divided into parking spaces 11a, 11b, 11c, 11d, etc., along the one curb 10a. It will be understood, of course, that similar parking spaces are provided where desired alongside the opposite curb 10b.

Positioned adjacent the respective parking spaces are the meters 12a, 12b, 12c, 12d, etc., which are mounted on any suitable support. The operator of a motor vehicle after positioning the vehicle in a parking space initiates operation by a prescribed coin deposited in a place provided in the meter housing. This operation initiates the metering of parking time.

Ordinarily a parking meter system is in use from the hours of 7 a. m. to 6 p. m. Accordingly, within these hours indication is given on central indicator annunciator board 14 of the operative or inoperative character of the various parking meters. Associated with the meters 12a, 12b, 12c, 12d, etc., by way of electrical conduits 13 and enclosed conductors, are the respective visual indicators, conveniently signal lights 14a, 14b, 14c, 14d, etc. Conveniently the indicating board 14 is divided into sections corresponding to the street blocks where meters are located. These sections are noted with the names of streets and avenues as illustratively shown in Figure 1 of the drawing.

The parking meter system is put into condition for operation at 7 a. m. No meters are in operation at this time. Where a vehicle already occupies one of the parking spaces, an indicating light on board 14 denotes which space is improperly in use. For example, where space 11d is occupied by vehicle 20, this result is achieved through a combination of electrical switching means 12ds, operated through the parking meter 12d, switching means 15d, directly controlled by the vehicle in the parking space, main switch 16 and the associated source of electrical energy 17, which preferably supplies an alternating current, operating the signal light on the indicator board through suitable electrical conductors interconnecting the same.

Switch 15d normally is maintained in an open position. The switch is closed, however, by the presence of the vehicle 20 in the parking space, thus conditioning the electrical circuit for actuation by the switch 12ds as more fully described hereinafter. Illustratively a wheel of vehicle 20 depresses the treadle 15dt against the action of a spring, not shown, effecting closure of the switch. It will be understood that upon removal of car 20 from parking space 11d, switch 15d will assume its open position.

The switch 12ds, conveniently included within the housing of parking meter 12d, as distinguished from switch 15d, normally is maintained in a closed circuit position. This switch is moved to open circuit position by the initiation of the operation of the parking meter upon the introduction of a coin, as noted above. The switch remains in open position until the meter registers expiration of parking privilege. At that instant, the switch is brought into its closed position in any convenient manner. Preferably the operation of switch 12ds is had by the meter-timing mechanism, for example, of the type generally described in the United States Letters Patent 2,038,963, of April 28, 1936, issued to N. M. Seeburg and entitled "Timing mechanism," illustratively shown at 12dm and associated interconnecting link 12dl; it being understood that the meter timing mechanism is reset, and switch 12ds is opened, upon deposit of a coin or token, whether from overtime position or from unfinished time position.

Where, for example, vehicle 20 is in parking position but meter 12d has not been put into operation through the depositing of a coin, annunciator signal light 14d will indicate improper parking. The signal light will be illuminated by source of energy 17, acting through the conductors 18d and 19d, the vehicle control switch 15d, the meter control switch 12ds and the system operating switch 16. Improper occupancy, by failure to pay the prescribed meter charge, is promptly noted at the central indication station.

When meter 12d is put into operation, as by depositing of coin of proper denomination, switch 12ds is immediately opened thereby breaking the circuit including the signal light 14d. The central indicator board 14 then will no longer show vehicle 20 to be improperly parked. There will be no further registering for parking space 11d, until after the expiration of the predetermined parking period. Ordinarily the parking privilege is for one hour, although it will be understood that at certain restricted areas, as for example, in front of banks, the duration of parking time may be set at 20 minutes.

Upon expiration of the allowed parking period the timing mechanism 12dm acts through link 12dl and closes switch 12ds, associated with the meter 12d. This action serves to complete the electrical circuit and the annunciator light 14d is illuminated. Inspection of the central control board 14 immediately reveals the car 20 has overstayed its parking privilege. An officer then may be sent to the parking space denoted by the signal light in order to identify the overparked vehicle and serve notice of the traffic violation.

Where vehicle 20 is withdrawn from parking space 11d prior to the expiration of parking privilege, it is to be noted that switch 15d is opened by virtue of the release of contact between vehicle and treadle 15dt. Expiration of a parking period, as measured by meter 12d and the resultant closure of switch 12ds, does not operate signal light 14d because the electrical circuit is open at switch 15d.

In my parking meter system, illustratively described above, it will be seen that prompt and reliable indication is given at a central point of an overstay of parking privilege in any parking space. In dense traffic areas it frequently happens that the available parking spaces are occupied substantially the entire parking day. Shortly after the vehicle is withdrawn from the particular space, the space is taken by another vehicle. In such areas savings in system installation may be effected by employing only the parking meter and its associated annunciator control switch. In this modified form of my parking system a meter 32b (see Figure 3) is positioned at street curb 30a, adjacent parking space 31b. Meter switch 32bs normally is in a closed position, as indicated in the drawing. Indicating element 34b of central station annunciator, not shown, is illuminated by source of electrical energy 36 and associated conductors 38b and 39b.

Upon initiation of meter operation, as by depositing of a coin by the operator of a vehicle, switch 32bs is opened, thus breaking the electrical circuit of the central station annunciator. Annunciator signal 34b is then released, showing that the parking space 31b is properly occupied.

Upon expiration of the period of parking privilege, timing mechanism 32bm acting through link 32bl again closes switch 32bs. Annunciator signal 34b then is energized by a source of alternating current electrical energy 36 indicating that meter 32b is not in operation. For most practical purposes this is sufficient indication that a vehicle improperly occupies the parking space adjacent the meter, since in downtown locations one vehicle enters a parking space just about as soon as another quits this space. A prolonged showing of the signal suggests that the parking space is improperly occupied. Such a modified form of system is simple, efficient and quite reliable. It permits considerable savings in installation since no vehicle-controlled switch is required.

Thus it will be seen that there is provided in my invention a system and apparatus in which the many objects hereinbefore set forth, together with many thoroughly practical advantages, are successfully achieved. It will be seen that my system and apparatus affords an efficient and reliable method of indicating overstay of parking privilege and permits prompt and comparatively inexpensive surveillance of a parking area.

As many possible embodiments may be made of my invention and as many changes may be made in the embodiments hereinbefore set forth, it will be understood that all matter described herein, or shown in the accompanying drawing, is to be interpreted as illustrative and not as a limitation.

I claim:

1. A system for controlling the parking of vehicles, comprising in combination a plurality of meters for timing a corresponding plurality of vehicles respectively parked adjacent thereto, each of said meters including coin-controlled means for initiating operation of the meter and means for indicating the expiration of a pre-determined period of time following such initiation; a plurality of means associated with said corresponding plurality of meters, each of said means being operated by the vehicle being parked adjacent said meter; an annunciator; and electrical means associated both with said vehicle-controlled means and said annunciator and with said meters and said annunciator, said means being operated by said vehicle-controlled means for actuating said annunciator to show improper occupation of the parking spaces upon parking one or more of said vehicles and actuating said annunciator to show proper occupation of the parking spaces upon initiating operation of said corresponding meters.

2. A system for controlling the parking of vehicles, comprising in combination, a plurality of meters for timing a corresponding plurality of parked vehicles, each of said meters including timing means, means controlled by coin or token for initiating operation of the same, and means actuated upon the expiration of a pre-determined period of time thereafter; a plurality of signal means for showing improper parking of one or more of said vehicles; vehicle-operated means associated with each of said meters for conditioning such signal means to show improper parking of a vehicle adjacent the meter; and means associated with said vehicle-operated means and each meter for interrupting actuation of said signal means during operation of the timing means of said meter, thereby denoting proper parking of said vehicle, and re-establishing actuation of such signal means, through action of said means actuated upon expiration of predetermined period, for denoting improper parking of such vehicle.

3. A system for controlling the parking of vehicles, comprising in combination, a plurality of meters for timing a corresponding plurality of parked vehicles upon depositing a coin or token in a meter, adjacent to which a vehicle is parked; an annunciator having an indicator for each of said meters, electrical means interconnecting said meters with said annunciator and including means for conditioning each meter upon parking a vehicle adjacent the same, and means operated by said meters upon initiation of operation of same for actuating said annunciator to designate the particular meter operated as such meter is put into operation and again actuating said annunciator to designate lack of operation of the meter upon the meter showing the expiration of a predetermined period of time following initiation of operation of the same.

4. A system for controlling the parking of vehicles, comprising in combination, a plurality of meters for timing a corresponding plurality of parked vehicles, each of said meters including signal means to show proper and improper parking adjacent thereto; an annunciator; and electrical means interconnecting each of said meters with said annunciator, said electrical means including circuit means operated by the meter upon signalling improper parking and also including circuit means operated by a vehicle upon its being parked adjacent the meter, said electrical means operating said annunciator to show improper parking during the time both of said circuit means are in said operated states.

5. A system for controlling the parking of vehicles, comprising in combination, a plurality of spaced coin-controlled vehicle timing means for timing a corresponding plurality of vehicles parked adjacent thereto and in operative association therewith; annunciator means located at a point remote therefrom; and means including electrical means for actuating the annunciator to signal improper parking adjacent any of said plurality of timing means upon bringing a vehicle into operative association therewith, and electrical means for actuating the annunciator to signal proper parking adjacent any one of said plurality of vehicle timing means, upon initiating operation of the same through deposit of coin or token therein and during operation of said one timing means.

W. S. SYMINGTON.